US009237493B2

(12) United States Patent
Kanamarlapudi et al.

(10) Patent No.: US 9,237,493 B2
(45) Date of Patent: Jan. 12, 2016

(54) METHODS AND APPARATUS FOR PROVIDING ENHANCED TIME-TO-TRIGGER MECHANISM TO IMPROVE UE CALL PERFORMANCE

(71) Applicant: QUALCOMM Incorporated, San Diego, CA (US)

(72) Inventors: Sitaramanjaneyulu Kanamarlapudi, San Diego, CA (US); Rohit Kapoor, San Diego, CA (US); Dan Zhang, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/096,860

(22) Filed: Dec. 4, 2013

(65) Prior Publication Data
US 2014/0349653 A1    Nov. 27, 2014

Related U.S. Application Data

(60) Provisional application No. 61/826,778, filed on May 23, 2013.

(51) Int. Cl.
*H04W 36/00*    (2009.01)
*H04W 36/36*    (2009.01)

(52) U.S. Cl.
CPC .......... *H04W 36/0088* (2013.01); *H04W 36/36* (2013.01)

(58) Field of Classification Search
CPC ..................................................... H04W 36/00

USPC ................................ 455/437, 550.1; 370/241
See application file for complete search history.

(56) References Cited

U.S. PATENT DOCUMENTS

| 2010/0124172 | A1  | 5/2010  | Tenny et al. |
| 2010/0130209 | A1* | 5/2010  | Florkey ................. H04W 36/36 455/437 |
| 2011/0028144 | A1  | 2/2011  | Catovic et al. |
| 2011/0292821 | A1  | 12/2011 | Chin et al. |
| 2012/0257509 | A1* | 10/2012 | Natarajan .......... H04B 7/15521 370/241 |

(Continued)

FOREIGN PATENT DOCUMENTS

| EP | 2 387 271 A1 | 11/2011 |
| WO | WO-2008/112126 A1 | 9/2008 |
| WO | WO 2011/041753 A2 | 4/2011 |

OTHER PUBLICATIONS

International Search Report and Written Opinion—PCT/US2014/039219—ISA/EPO—Oct. 16, 2014. (10 total pages).

*Primary Examiner* — David Q Nguyen
(74) *Attorney, Agent, or Firm* — Arent Fox LLP

(57) ABSTRACT

Methods and apparatus for wireless communication include monitoring, by a user equipment, a signal quality value from at least one of a serving cell or a target cell. The methods and apparatus further include determining, at an expiration of an internal time to trigger (TTT) less than a network-configured TTT, that at least one of the signal quality value from the serving cell is below a serving cell threshold value, or the signal quality value from the target cell is above the signal quality of the serving cell by a comparative threshold value. Moreover, the methods and apparatus include triggering generation of a measurement report based on the determination.

18 Claims, 8 Drawing Sheets

(56) References Cited

U.S. PATENT DOCUMENTS

2013/0053025 A1    2/2013    Lindoff et al.
2014/0256326 A1*    9/2014    Morgan ............ H04W 36/0016 455/437

* cited by examiner

METHODS AND APPARATUS FOR PROVIDING ENHANCED TIME-TO-TRIGGER MECHANISM TO IMPROVE UE CALL PERFORMANCE

CLAIM OF PRIORITY UNDER 35 U.S.C. §119

The present Application for Patent claims priority to Provisional Application No. 61/826,778 entitled "METHODS AND APPARATUS FOR PROVIDING ENHANCED TIME-TO-TRIGGER MECHANISM TO IMPROVE UE CALL PERFORMANCE" filed May 23, 2013, and assigned to the assignee hereof and hereby expressly incorporated by reference herein.

BACKGROUND

Aspects of the present disclosure relate generally to wireless communication systems, and more particularly, to improvement of call performance during poor or changing radio conditions and/or severe changes in radio conditions.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Currently, in a soft hand off mode, a Change of best cell procedure may be triggered by a user equipment (UE) using an Event 1D measurement request indicating that a target cell has performed better than a serving cell for approximately a Time-To-Trigger (TTT) duration as per the equation given in 3GPP 25.331 RRC Protocol Specification sub-clause 14.1.2.4 "Reporting Event 1D: Change of best cell." Where a cell is small and/or a network configured TTT is large, the UE might not be able to communicate with the serving cell by the time TTT has expired. As such, an Event 1D measurement may not be triggered and/or transmitted to the serving cell. Further, even where the Event 1D message is able to be transmitted to serving cell, the UE may lose its connection with the serving cell thereafter and may not be able to complete the Change of Best Cell procedure successfully and completely.

Thus, improved apparatus and methods for call performance during poor or quickly changing radio conditions and/or severe changes in radio conditions may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving call performance by enabling uplink transmissions during poor or changing downlink radio conditions.

In one aspect, a method of wireless communications comprises monitoring, by a user equipment (UE), a signal quality value from at least one of a serving cell or a target cell. The method further comprises determining, at an expiration of an internal time to trigger (TTT) less than a network-configured TTT, that at least one of the signal quality value from the serving cell is below a serving cell threshold value, or the signal quality value from the target cell is above the signal quality of the serving cell by a comparative threshold value. Moreover, the method comprises triggering generation of a measurement report based on the determination.

In another aspect, a computer program product comprising a computer-readable medium including at least one instruction executable to cause a computer to monitor, by a user equipment, a signal quality value from at least one of a serving cell or a target cell. The computer-readable medium further including at least one instruction executable to cause a computer to determine, at an expiration of an internal time to trigger (TTT) less than a network-configured TTT, that at least one of the signal quality value from the serving cell is below a serving cell threshold value, or the signal quality value from the target cell is above the signal quality of the serving cell by a comparative threshold value. Moreover, the computer-readable medium includes at least one instruction executable to cause a computer to trigger generation of a measurement report based on the determination.

Further, an apparatus for wireless communications comprises means for monitoring, by a user equipment, a signal quality value from at least one of a serving cell or a target cell. Further, the apparatus comprises means for determining, at an expiration of an internal time to trigger (TTT) less than a network-configured TTT, that at least one of the signal quality value from the serving cell is below a serving cell threshold value, or the signal quality value from the target cell is above the signal quality of the serving cell by a comparative threshold value. Moreover, the apparatus comprises means for triggering generation of a measurement report based on the determination.

Moreover, an apparatus for communication comprises a downlink signal condition monitoring module configured to monitor a signal quality value from at least one of a serving cell or a target cell. The apparatus further comprises a severe cell change determination module configured to determine, at an expiration of an internal time to trigger (TTT) less than a network-configured TTT, that at least one of the signal quality value from the serving cell is below a serving cell threshold value, or the signal quality value from the target cell is above the signal quality of the serving cell by a comparative threshold value. Moreover, the severe cell change determination module is configured to trigger generation of a measurement report based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. The various concepts presented throughout this disclosure may be implemented across a broad variety of telecommunication systems, network architectures, and communication standards.

The present aspects generally relate to improving call performance during poor or changing radio conditions and/or severe changes in radio conditions. Specifically, during soft handover, the UE may detect or otherwise determine that a target cell exhibits higher communication characteristics (e.g., signal strength) than a serving cell. Further, for example, the UE may make such determination within a TTT. That is, if the UE determines that target cell exhibits better or higher communication characteristics than a serving cell within the TTT, then the UE may trigger the sending or transmission of a measurement report to the serving cell. However, when UE experiences poor or changing radio conditions, the measurement report may not be transmitted to the serving cell in time to complete handover, resulting in a dropped call. In other aspects, even when the UE transmits the measurement report to the serving cell, the poor or changing radio conditions nonetheless prevent the completion of the handover to the target cell.

As such, the present methods and apparatus may trigger transmission of a measurement report to a serving cell at an expedited time relative to a network configured or defined TTT. Accordingly, in some aspects, the present methods and apparatus may provide an efficient solution, as compared to current solutions, to enable the UE to handover or otherwise engage in reselection with potentially more suitable cells, e.g. relative to a serving cell, providing communication coverage to the position of the UE, at an expedited time relative to a network configured or defined TTT. Additionally, the present methods and apparatus may provide a mechanism by which to overcome call drops resulting from poor or changing radio conditions.

Figure 1:
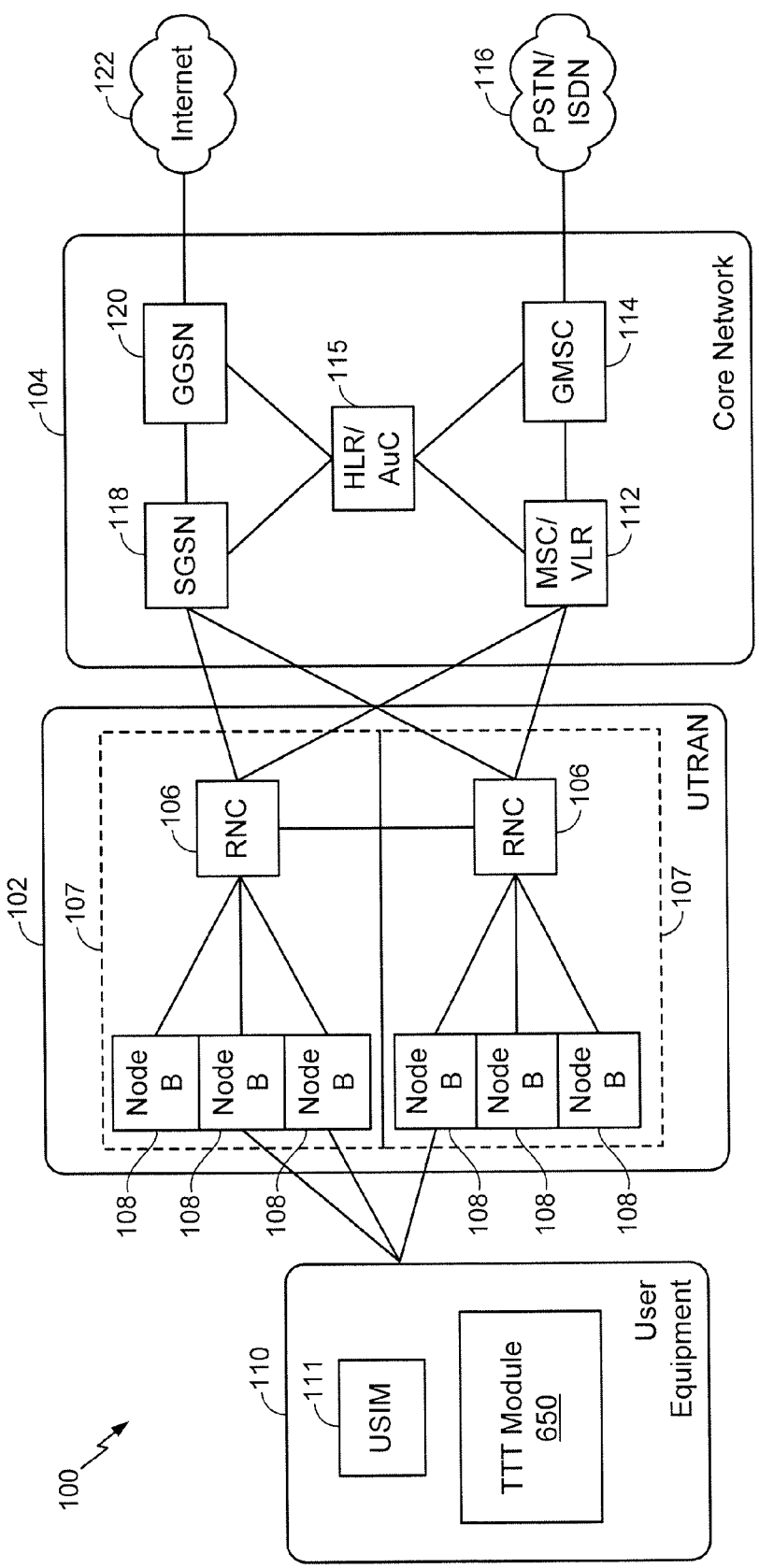
FIG. 1 is a block diagram conceptually illustrating an example of a telecommunications system in accordance with an aspect of the present disclosure.

By way of example and without limitation, the aspects of the present disclosure illustrated in FIG. 1 are presented with reference to a UMTS system 100 employing a W-CDMA air interface. A UMTS network includes three interacting domains: a Core Network (CN) 104, a UMTS Terrestrial Radio Access Network (UTRAN) 102, and User Equipment (UE) 110 including TTT module 650, which may be configured to monitor a signal quality value from one or more of a serving cell or a target cell (e.g., any one of NodeBs 108) and trigger generation of a measurement report based on determining that one or more of the signal quality value from the serving cell is below a serving cell threshold value, or the signal quality value from the target cell is above the signal quality of the serving cell by a comparative threshold value.

In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 110 to increase the data rate or to multiple UEs 110 to increase the overall system capacity. This is achieved by spatially precoding each data stream and then transmitting each spatially precoded stream through a different transmit antenna on the downlink. The spatially precoded data streams arrive at the UE(s) 110 with different spatial signatures, which enables each of the UE(s) 110 to recover the one or more the data streams destined for that UE 110. On the uplink, each UE 110 may transmit one or more spatially precoded data streams, which enables the node B 108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 2:
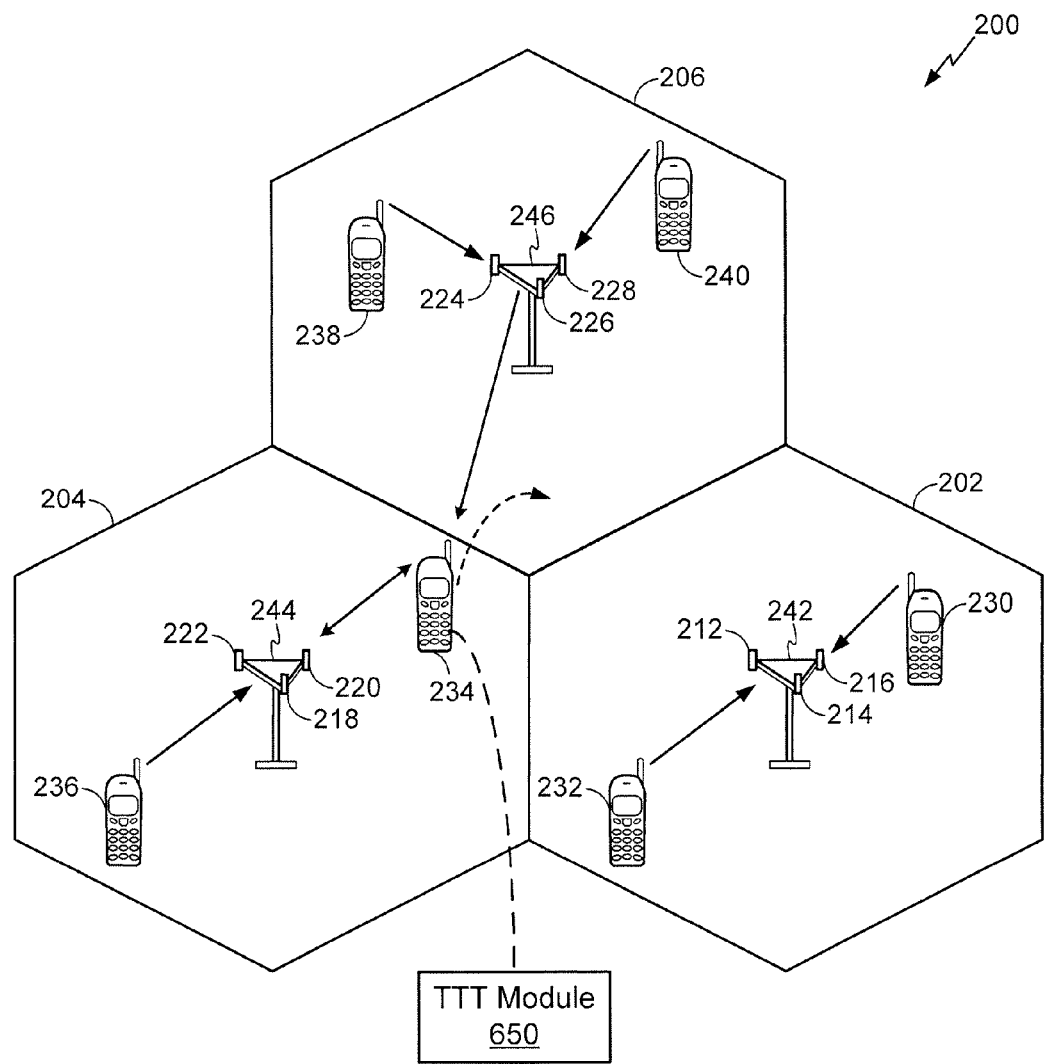
FIG. 2 is a conceptual diagram illustrating an example of an access network in accordance with an aspect of the present disclosure.

Referring to FIG. 2, an access network 200 in a UTRAN architecture is illustrated. The multiple access wireless communication system includes multiple cellular regions (cells), including cells 202, 204, and 206, each of which may include one or more sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 may include several wireless communication devices, e.g., User Equipment or UEs, which may be in communication with one or more sectors of each cell 202, 204 or 206. For example, UEs 230 and 232 may be in communication with Node B 242, UE 234 including TTT module 650, and UE 236 may be in communication with Node B 244, and UEs 238 and 240 can be in communication with Node B 246. Here, each Node B 242, 244, 246 is configured to provide an access point to a CN 104 (see FIG. 1) for all the UEs 230, 232, 234, 236, 238, 240 in the respective cells 202, 204, and 206.

As the UE 234, which may include TTT module 650, moves from the illustrated location in cell 204 into cell 206, a serving cell change (SCC) or handover may occur in which communication with the UE 234 transitions from the cell 204, which may be referred to as the source cell, to cell 206, which may be referred to as the target cell. Management of the handover procedure may take place at the UE 234 (e.g., via TTT module 650), at the Node Bs corresponding to the respective cells, at a radio network controller 106 (see FIG. 1), or at another suitable node in the wireless network. For example, during a call with the source cell 204, or at any other time, the UE 234 may monitor various parameters of the source cell 204 as well as various parameters of neighboring cells such as cells 206 and 202. Further, depending on the quality of these parameters, the UE 234 may maintain communication with one or more of the neighboring cells. During this time, the UE 234 may maintain an Active Set, that is, a list of cells that the UE 234 is simultaneously connected to (i.e., the UTRA cells that are currently assigning a downlink dedicated physical channel DPCH or fractional downlink dedicated physical channel F-DPCH to the UE 234 may constitute the Active Set).

In an example operational aspect, UE 234 may be in a soft hand off mode. In such an aspect, UE 234, via TTT module 650, may perform measurements for a time duration (e.g., a TTT duration). During this time duration, the UE may filter values used for the measurement evaluation. The TTT may be reset whenever the condition is not met to trigger the event (e.g., event 1D). For example, a TTT may be configured by the network to be 2560 ms (the 3GPP specification (subclause 10.3.7.64) allows for the TTT duration to be configured between 0 and 5000 ms). Higher values of TTT may be selected by the network to ensure that Change of best cell is initiated only when the UE 234 determines a sustained better cell 206 than a currently serving cell 204. Further, higher values for TTT may assist in avoiding the probability of ping-ponging.

Conversely, a higher value of TTT may delay the triggering event even where the radio conditions are rapidly deteriorating for the serving cell. In such an aspect, UE 234 might not get a chance to trigger the Event 1D and/or might not get a chance to send out the Event 1D message. Further, in such an aspect, without the Event 1D transmission and sufficient time to receive an Active Set Update (ASU) message and complete the Change of bell cell procedure, UE 234 might not be able to reselect/handover to a best cell 206 which may result in a call drop due to Radio Link Failure (RLF). On the contrary, a smaller value of TTT may cause more ping-pong behavior in overlapping cell areas. Further, a smaller network configured value of TTT may become problematic in the deep fading environment where the fluctuations of signaling characteristics can be seen quite frequently between the two cells.

Figure 5:
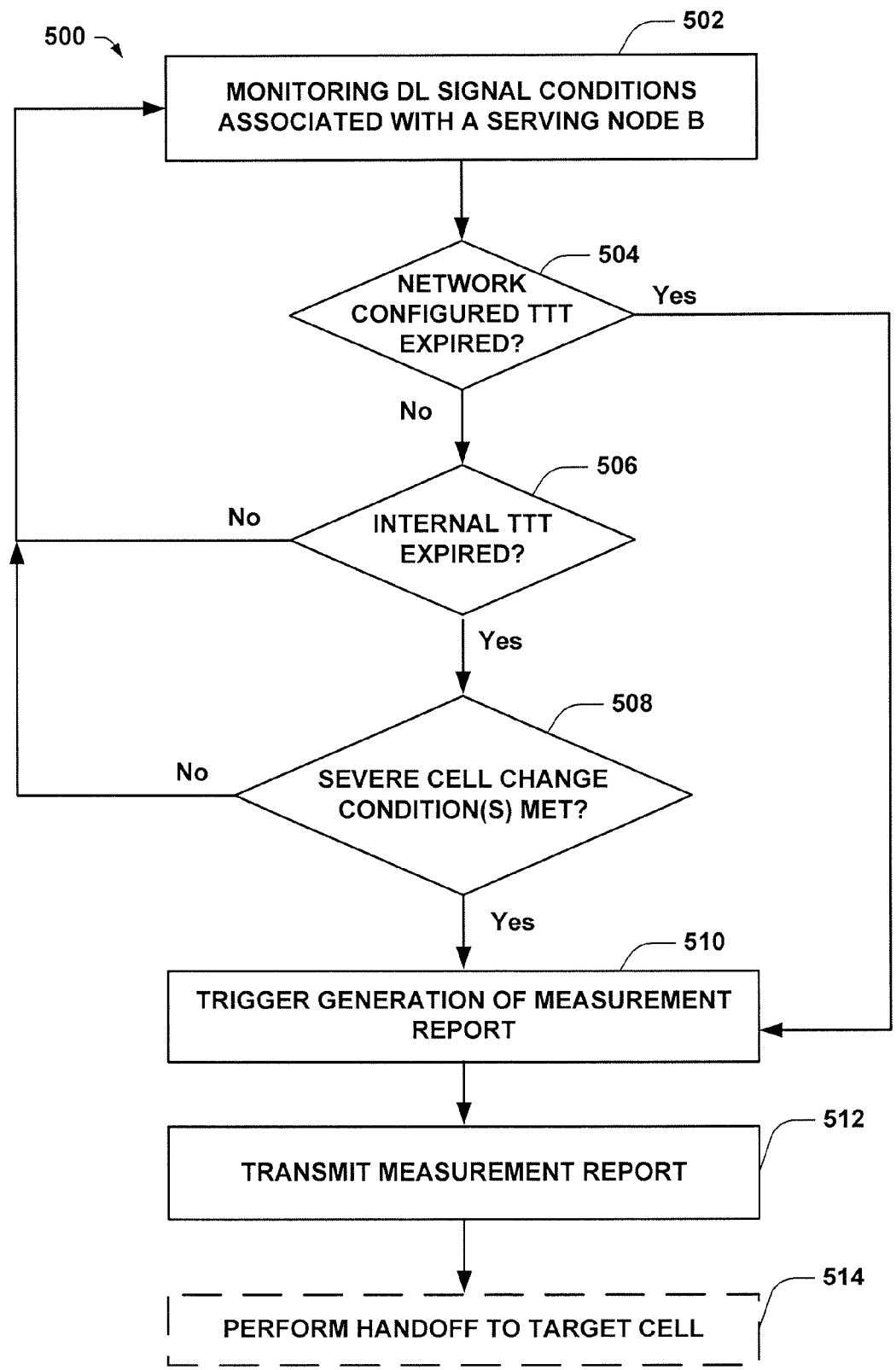
FIG. 5 is a flow chart of an example methodology for improving call performance during poor or changing downlink radio conditions, according to an aspect of the present disclosure.

Continuing the above aspect, to improve performance for UE 234 during handoff in an environment which may experience severe changes in cell quality, an internal TTT value may be selected by UE 234 (e.g., via TTT module 650). In an aspect, the internal TTT may be set to a value such as, but not limited to, 320 ms, 160 ms, etc., and UE 234 (e.g., via TTT module 650) may perform measurements based on the internal TTT. For example, where a network configured TTT is set to 2560 ms, the UE 234 may perform measurements every 320 ms based on the internal TTT. Where the filtered measurement values continue to satisfy the triggering event towards the target cell 206 using Internal TTT as indicated in FIG. 5, the following conditions may be evaluated by the UE 234 (e.g. via TTT module 650).

First, where the serving cell signal quality drops below a first threshold (X), the UE 234 may trigger the measurement report (e.g., event 1D). In such an aspect, the measurement report may be triggered because if the UE 234 were to continue to monitor for full network configured TTT duration, UE 234 may not have sufficient time to successfully send the measurement report, receive an ASU message, and complete a Change of best cell procedure prior to losing the connection with the serving cell 204. Second, where the target cell signal quality is better than serving cell by second threshold (Y), the UE 234 (e.g., via TTT module 650) may trigger the measurement report (e.g., event 1D). As such, where cell characteristics are changing slowly as expected by network planning, the first and second conditions may not be satisfied and the UE 234 (e.g., via TTT module 650) may trigger the measurement report at the expiration of the network configured TTT. While when the cell characteristics are changing rapidly, one or more of the first or second conditions may be meant and may trigger the generation of the measurement report prior to the expiration of the network configured TTT.

In an aspect, thresholds (X) and (Y) may be modified by values associated with the cells (e.g., cell individual offset (CIO)) values). Since a CIO value may be added to a measurement quantity before evaluating the triggering condition, ignoring such a CIO value may be acceptable in some aspects. Such adjustment of the measurement quantity and/or threshold by the CIO value may provide a type of hysteresis that permits the UE to stay with a serving cell to avoid ping-pong handovers (e.g., rapid switching between serving cell and target cell). Additionally or in the alternative, a percentage of the CIO value (e.g., 50% of CIO) may be added to X and/or Y during evaluation. In an aspect, a CIO value corresponding to a Primary Common Pilot Channel (PCPICH) may be considered, as each PCPICH may have an individualistic value either positive or negative depending on the cell characteristics in the end-to-end network planning. (e.g., See, 3GPP 25.331 Sub-clause 14.1.5.3 Cell Individual Offsets).

Further discussion of the UE 234 (e.g., including TTT module 650) functionality during a soft handoff mode is discussed with reference to the aspects described in FIG. 5.

The modulation and multiple access scheme employed by the access network 200 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 3.

Figure 3:
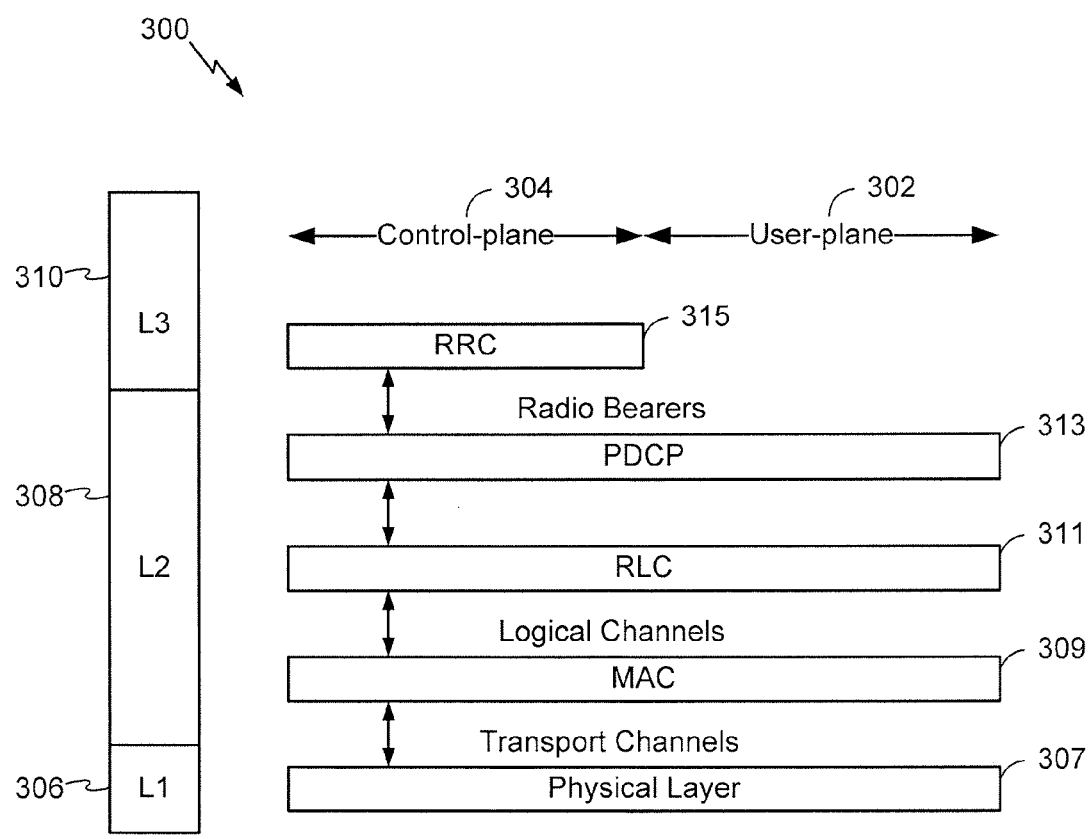
FIG. 3 is a conceptual diagram illustrating an example of a radio protocol architecture for the user and control plane in accordance with an aspect of the present disclosure.

Referring to FIG. 3, an example radio protocol architecture 300 relates to the user plane 302 and the control plane 304 of a UE or node B/base station. In some aspects, apparatus 602 (FIG. 6) including TTT module 650 may be configured to communicate according to radio protocol architecture 300. For example, architecture 300 may be included in a UE such as wireless device 110 (FIG. 1). The radio protocol architecture 300 for the UE and node B is shown with three layers: Layer 1 306, Layer 2 308, and Layer 3 310. Layer 1 306 is the lowest lower and implements various physical layer signal processing functions. As such, Layer 1 306 includes the physical layer 307. Layer 2 (L2 layer) 308 is above the physical layer 307 and is responsible for the link between the UE and node B over the physical layer 307. Layer 3 (L3 layer) 310 includes a radio resource control (RRC) sublayer 315. The RRC sublayer 315 handles the control plane signaling of Layer 3 between the UE and the UTRAN.

In the user plane, the L2 layer 308 includes a media access control (MAC) sublayer 309, a radio link control (RLC) sublayer 311, and a packet data convergence protocol (PDCP) 313 sublayer, which are terminated at the node B on the network side. Although not shown, the UE may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 313 provides multiplexing between different radio bearers and logical channels. The PDCP sublayer 313 also provides header compression for upper layer data packets to reduce radio transmission overhead, security by ciphering the data packets, and handover support for UEs between Node Bs. The RLC sublayer 311 provides segmentation and reassembly of upper layer data packets, retransmission of lost data packets, and reordering of data packets to compensate for out-of-order reception due to hybrid automatic repeat request (HARQ). The MAC sublayer 309 provides multiplexing between logical and transport channels. The MAC sublayer 309 is also responsible for allocating the various radio resources (e.g., resource blocks) in one cell among the UEs. The MAC sublayer 309 is also responsible for HARQ operations.

Figure 4:
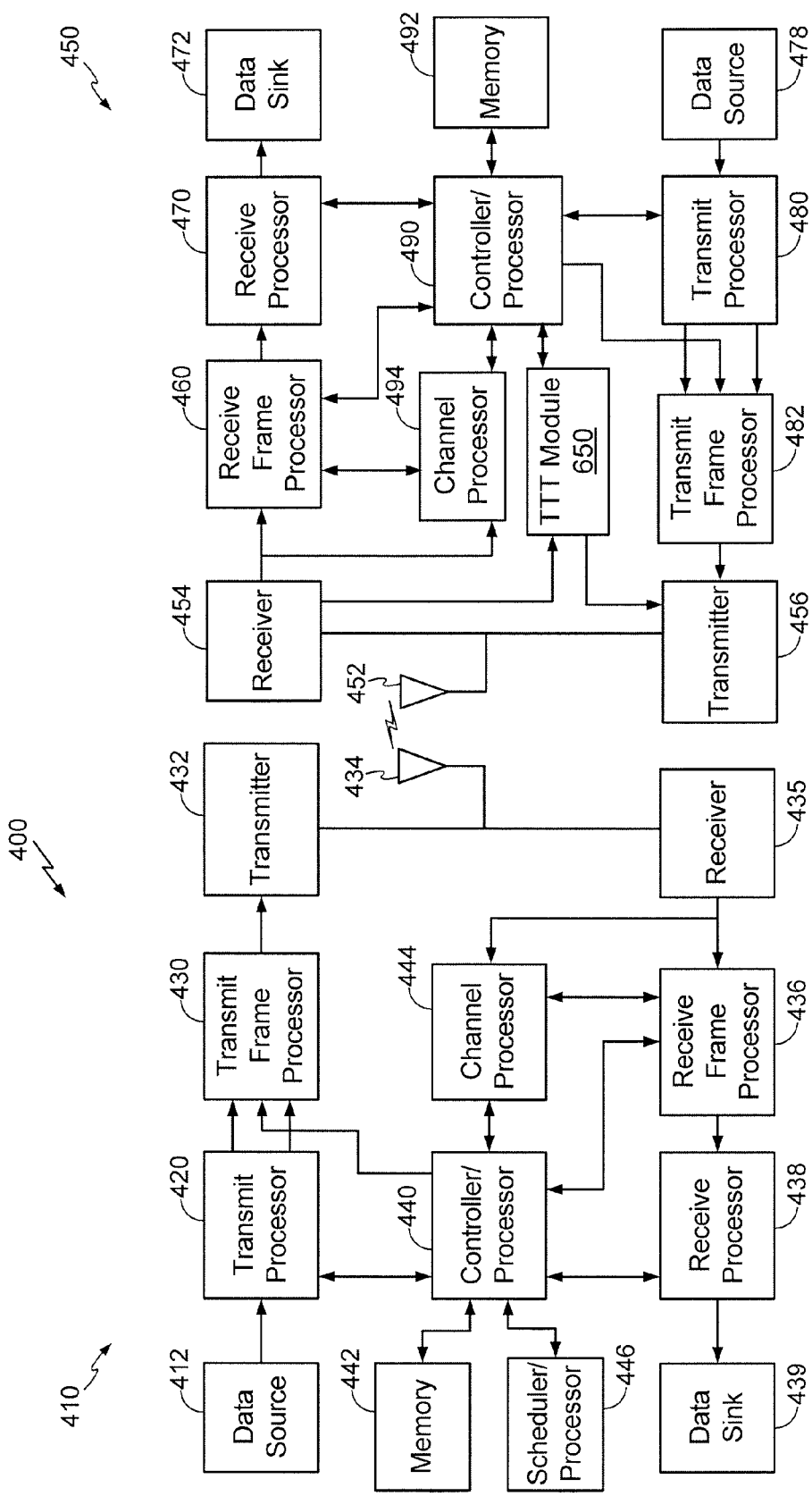
FIG. 4 is a block diagram conceptually illustrating an example of a Node B in communication with a UE in a telecommunications system in accordance with an aspect of the present disclosure.
Figure 6:
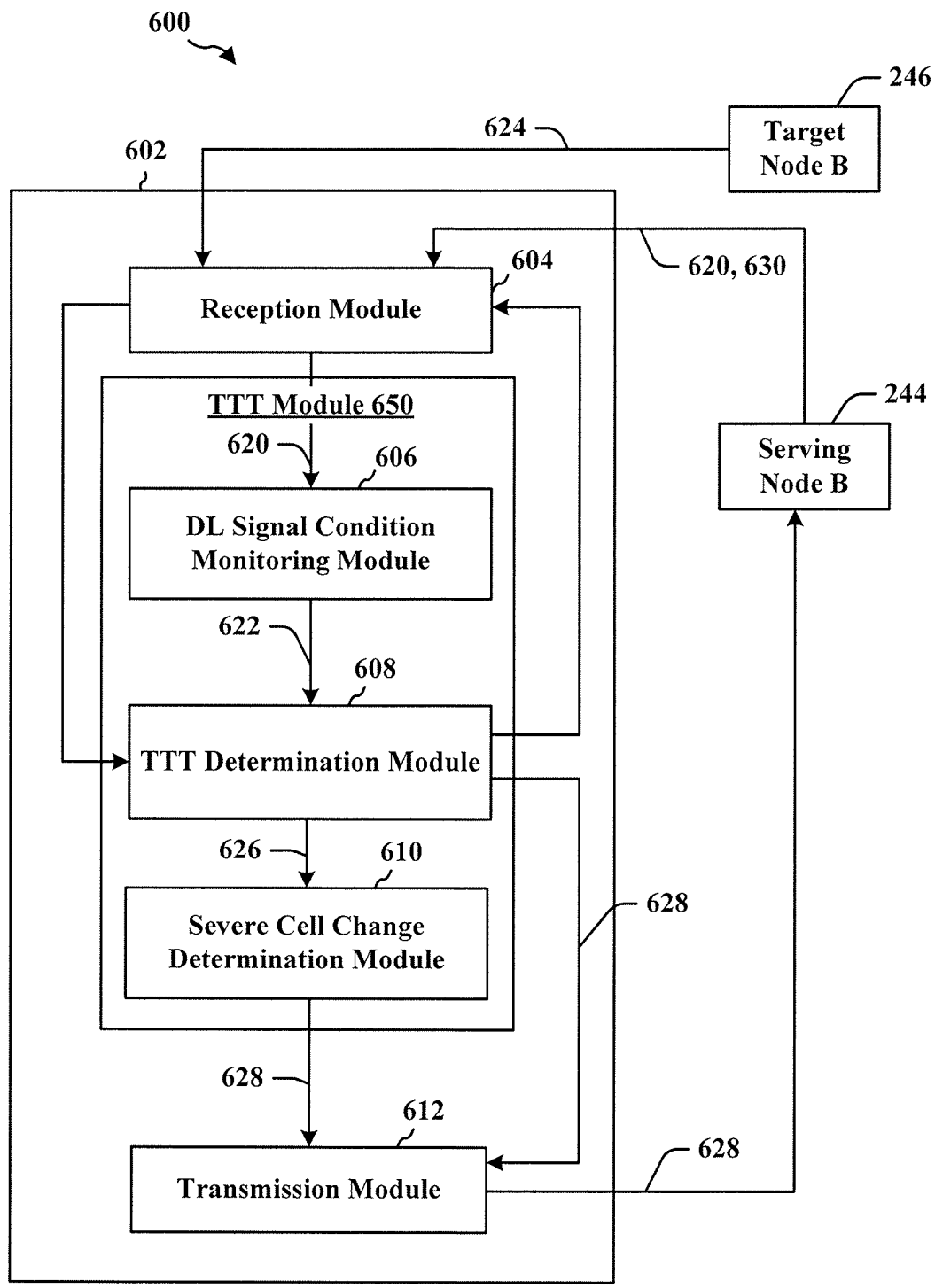
FIG. 6 is a conceptual diagram illustrating the data flow between different modules/means/components in an example apparatus.

FIG. 4 is a block diagram of a Node B 410 in communication with a UE 450, where the Node B 410 may be the Node B 108 in FIG. 1, and the UE 450 may be the UE 110 in FIG. 1 or the apparatus 602 of FIG. 6, both of which may include TTT module 650. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 may be provided to any one or more of TTT module 650 and a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452. Additionally, information from TTT module 650 may be provided to transmitter 456.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Turning to FIG. 5, an example methodology 500 is displayed that improves call performance during poor or changing DL radio conditions. In an aspect, the methodology may be performed by a UE in, for example, a WCDMA based access network. The example methodology 500 is shown and described as a series of acts for purposes of simplicity of explanation. However, it is to be understood and appreciated that the method (and further methods related thereto) are not limited by the order of acts, as some acts may, in accordance with one or more aspects, occur in different orders and/or concurrently with other acts from that shown and described herein. For example, it is to be appreciated that the method may alternatively be represented as a series of interrelated states or events, such as in a state diagram. Moreover, not all illustrated acts may be required to implement a method in accordance with one or more features described herein.

At 502, UE may monitor DL signal conditions associated with at least a serving Node B and/or one or more target Node Bs. In an aspect, as described herein, apparatus 602 (FIG. 6) may execute DL signal condition monitoring module 606 to perform the monitoring of DL signaling 620 received from a serving Node B 244 and/or DL signals 624 received from a target Node B 246. In an aspect, the monitoring may be performed as part of a soft hand off procedure. Further, in some aspects, the monitoring comprises receiving signals at a receiver and/or transceiver, and measuring signal characteristics of such signals, such as signal strength.

At 504, the UE may determine whether a network configured TTT value has expired. In an aspect, as described herein, TTT module 650 (FIG. 6) may to execute TTT determination module 608 to perform the determination as to whether the network configured TTT value has expired. In an aspect, the network configured TTT duration may be set to a value such as 2560 ms. In some aspects, one or more timers (e.g., first timer corresponding to the network configured TTT and a second timer corresponding to the internal TTT) may provide an indication (e.g., timer value) as to the duration of the TTT. Additionally, TTT determination module 608 may be executed to determine whether the timer set to the network configured TTT value has expired. In other aspects, the timer may provide an indication to TTT determination module 608 indicating an expiration of the timer configured with the network configured TTT value.

If at 504, the UE determines that the network configured TTT duration has expired and that the conditions for generation of the measurement report with target cell information have been met, then the UE may trigger to generation of a measurement report at 510 (e.g., a Event 1D message). In an aspect, as described herein, TTT module 650 (FIG. 6) may execute TTT determination module 608 to perform the determination that the network TTT duration has expired and DL signal condition monitoring module 606 may perform the determination as to whether the conditions 622 for generation of measurement report have been met, and generation of the measurements report 628 is triggered.

In some aspects, the measurement report comprises an indication of a change of best cell (e.g., from serving cell to target cell). Further, the conditions for generation of the measurement report may include a condition that the signal quality value from the serving cell is at or below a serving cell threshold value and/or another condition that the signal quality value from the target cell is at or above the signal quality of the serving cell by a comparative threshold value. In further, aspects, triggering generation of the measurement report may include forming the measurement report at the UE for transmission to the serving cell.

If at 504, the UE determines that the network configured TTT has not expired, then at 506, the UE may determine whether an internal TTT duration has expired. In an aspect, as described herein, TTT module 650 (FIG. 6) may execute TTT determination module 608 to perform the determination as to whether the internal TTT duration has expired. In an aspect, the internal TTT duration may be set to a value such as 360 ms, 160 ms, etc. In some aspects, one or more timers (e.g., first timer corresponding to the network configured TTT and a second timer corresponding to the internal TTT) may provide an indication (e.g., timer value) as to the duration of the TTT. Additionally, TTT determination module 608 may be executed to determine whether the timer set to the internal TTT value has expired. In other aspects, the timer may provide an indication to TTT determination module 608 indicating an expiration of the timer configured with the internal TTT value.

If at 506, the UE determines that the internal TTT duration has not expired, then the process may return to 502 and the UE may continue to monitor the DL signal conditions for the serving Node B and the target Node B. In an aspect, as described herein, TTT module 650 (FIG. 6) may execute TTT determination module 608 to perform the determination as to whether the internal TTT duration has expired.

If at 506, the internal TTT duration has expired, then at 508 the UE determines whether one or more severe cell change conditions have been met. In an aspect, a first condition may be met where the serving cell signal quality drops below a first threshold (X). In another aspect, a second condition may be met where the target cell signal quality is better than serving cell by second threshold (Y). In an aspect, TTT module 650 (FIG. 6) may execute severe cell change determination module 610 to perform the determination based on the internal TTT duration expiring 626.

Additionally, the one or more severe cell change conditions may indicate to the UE that a transmission of the measurement report to the serving cell prior to an expiration of the network configured TTT value be performed. Further, the conditions for generation of the measurement report may include the condition that the signal quality value from the serving cell is at or below a serving cell threshold value and/or the second condition that the signal quality value from the target cell is at or above the signal quality of the serving cell by a comparative threshold value.

If at 508, the none of the severe cell change conditions have been met, then the process may return to 502 and the UE may continue to monitor the signal quality and/or DL signal conditions (620, 624) for the serving Node B 244 and the target Node B 246. In an aspect, as described herein, TTT module 650 (FIG. 6) may execute severe cell change determination module 610 to perform the determination.

If at 508, the UE determines that one or more severe cell change conditions have been met, then at 510 the UE triggers generation of a measurement report. In an aspect, as described herein, TTT module 650 (FIG. 6) may execute the severe cell change determination module 610 to perform the determination to prompt the UE to generate a measurement report 628 based on measurements performed by reception module 604. In some aspects, the measurement report comprises an indication of a change of best cell (e.g., from serving cell to target cell). In further, aspects, triggering generation of the measurement report may include forming the measurement report at the UE for transmission to the serving cell.

At 512, the UE may transmit the measurement report. In an aspect, apparatus 602 (FIG. 6) may execute transmission module 612 to transmit the measurement report 628 to a serving Node B 244. In some aspects, the measurement report comprises an indication of a change of best cell (e.g., from serving cell to target cell). In further, aspects, triggering generation of the measurement report may include forming the measurement report at the UE for transmission to the serving cell.

In an optional aspect, based on the transmitted measurement report 628, at 514, the UE may perform a hand off to a target cell. In an aspect, the measurement report 628 may be transmitted by transmission module 612 to the serving Node B 244. In response to reception of the measurement report 628, the serving Node B 244 may transmit a message (e.g., a PhysicalChannelReconfiguration (PCR) message, a RadioBearerReconfiguration (RBR) message, etc.) 630 to the UE as part of a Change of best cell procedure. Thereafter, the UE may transmit a confirmation response using transmission module 612 and may perform the handover procedure to the target cell and target Node B 246. Any one or more of the various component and/or subcomponents of apparatus 602 (FIG. 6) may be executed to perform one or more of the aspects described herein with respect to FIG. 5.

FIG. 6 is a conceptual data flow diagram 600 illustrating the data flow between different modules/means/components in an example apparatus 602. The apparatus may be a wireless device (e.g., UE, etc.). As noted above with respect to the flowchart described in FIG. 5, the apparatus 602 includes a reception module 604, a transmission module 612 and a TTT module 650 which may include a DL signal condition monitoring module 606, a TTT determination module 608 and a severe Cell Change determination module 610.

For example, in an aspect, apparatus 602 may include reception module 604, which may be configured to receive one or more signal quality values (e.g., based on DL signals 624) for subsequent transmission to one or more components/subcomponents of apparatus 602 (e.g., TTT module 650). In some aspects, reception module 604 may be configured to receive a signaling message from the serving cell (e.g., serving Node B. 244) as part of or related to a Change of Best Cell procedure. In other aspects, the signaling message may include a pilot signal/symbol or another signal that the UE may use to determine whether or not the cell is a handoff candidate (e.g., if it is a possible target), or if the serving cell conditions are changing and the UE needs to handoff away from the current serving cell.

In further aspects, apparatus 602 may include TTT module 650, which may be configured to trigger transmission of a measurement report (e.g., Event 1D message) at an earlier or expedited time relative (e.g., expiry of internal TTT value) to a normal measurement report transmission (e.g., expiry of network configured TTT value) to facilitate effective reselection/handover. For example, TTT module 650 may initiate a determination as to whether poor or changing radio conditions exist (e.g., using severe cell change determination module 610) more frequently based on the internal TTT value set at less than the network configured TTT value. That is, the internal TTT value may be determined or set at a value less than the network configured TTT value. As such, TTT module 650 may be configured to determine or otherwise detect if radio conditions are rapidly degrading with the serving cell (or if a more suitable target cell is nearby), and thus TTT module 650 may quickly trigger a measurement report in order to initiate or conduct reselection/handover.

In one aspect, TTT module 650 may include DL signal condition monitoring module 606, which may be configured to monitor or otherwise continuously determine a signal quality value 620 from one or both of serving Node B 244 and target Node B 246. For instance, DL signal condition monitoring module 606 may monitor the downlink signal and/or radio conditions associated with serving Node B 244 and/or target Node B 246. Additionally, DL signal condition monitoring module 606 may be configured to provide the downlink signal conditions, or at least one or more indications signifying a signal quality value 620 to one or more components of TTT module (e.g., severe cell change determination module 610). It should be understood that DL signal condition monitoring module 606 may also be configured to monitor uplink channel and/or radio conditions.

As a further example, TTT determination module 608 may be configured to determine whether one or both of a network configured TTT value and an internal TTT value have expired. In such aspects, for example, TTT determination module 608 may receive, store, include, or otherwise determine the network configured TTT value and the internal TTT value. For example, the internal TTT value may be a function of the network configured TTT value. That is, TTT determination module 608 may select the internal TTT as a function of a minimum TTT and the network-configured TTT.

TTT determination module 608 may be configured to provide an indication 626 (e.g., internal TTT value) to sever cell change determination module upon expiration of the internal TTT value. Additionally, TTT determination module 608 may be configured to, based on the internal TTT value expiration, trigger the determination (e.g., by severe cell change determination module 610) at an expedited time relative to the network-configured TTT. In some aspects, the minimum TTT comprises a UE configured time duration.

In addition, TTT determination module 608 may be configured to select the internal TTT as a function of a minimum TTT and the network-configured TTT. That is, the internal TTT triggers the determination (e.g., by severe cell change determination module 610) at an expedited time relative to the network-configured TTT. In some aspects, the minimum TTT comprises a UE configured time duration. In other aspects, the minimum TTT may be a factor of the network configured TTT. That is, TTT determination module 608 may be configured to set or otherwise determine a factor by which to then determine one or both of the internal TTT and the minimum TTT. For example, in some non-limiting aspects, TTT determination module 608 may set the factor to eight, thereby setting or making the internal TTT smaller than the network configured TTT by a factor of eight.

Moreover, apparatus 602 may include severe cell change determination module 610, which may be configured to determine (e.g., at an expiration of an internal TTT less than a network configured TTT) that one or both of the signal quality from the serving cell (e.g., serving Node B 244) may be at and/or below a serving cell threshold value and/or that a signal quality value from the target cell (e.g., target Node B 246) is at and/or above the signal quality of the serving cell by a comparative threshold value.

In some aspects, the foregoing comparison to one or both of the threshold values (e.g., serving cell threshold value and comparative threshold value) may also or alternatively be referred as server cell change conditions. That is, a positive indication resulting from the foregoing comparison may mean that the sever cell change condition has been met. In such case, TTT determination module 608 may trigger generation or otherwise provide indication to the transmission module 612 to trigger generation of a measurement report.

In additional aspects, one or both of the serving cell threshold value or the target cell threshold value may be modified, e.g., adjusted, by adding a value corresponding to a cell individual offset (CIO) value for the given cell. That is, the CIO value for one or both of the serving cell (e.g., serving Node B 244) and target cell (e.g., target Node B 246) may correspond to a PCPICH for the corresponding cell. In such aspects, the modification may include adding a percentage or portion of the CIO value to the corresponding cell threshold value. Additionally, severe cell change determination module 610 may be configured to perform the determination based on the internal TTT value received or otherwise obtained from the TTT determination module 608.

Further, apparatus 602 may include transmission module 612, which may be configured to transmit the measurement report to the serving cell (e.g., serving Node B 244). Even more, one or more components and/or various subcomponents (e.g., reception module 604 and/or transmission module 612) may be configured to facilitate reselection and/or handover to the target cell (e.g., target Node B 246) based on, for instance, the reception of the signal message.

The apparatus may include additional modules and/or components or subcomponents that may be configured to perform or execute each of the aspects described with respect FIG. 5. As such, each module/component in the aforementioned aspects of FIG. 5 may be performed by a module and the apparatus may include one or more of those modules. The modules may be one or more hardware components specifically configured to carry out the processes/algorithm, implemented by a processor configured to perform the processes/algorithm, stored within a computer-readable medium for implementation by a processor, or some combination thereof.

In some aspects, apparatus 602 may also be referred to by those skilled in the art (as well as interchangeably herein) as a UE, mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, or some other suitable terminology.

Additionally, serving Node B 244 and/or target Node B 246 may be a macrocell, picocell, femtocell, access point, relay, Node B, mobile Node B, UE (e.g., communicating in peer-to-peer or ad-hoc mode with apparatus 602), or substantially any type of component that can communicate with apparatus 602 to provide wireless network access at the apparatus 602.

Figure 7:
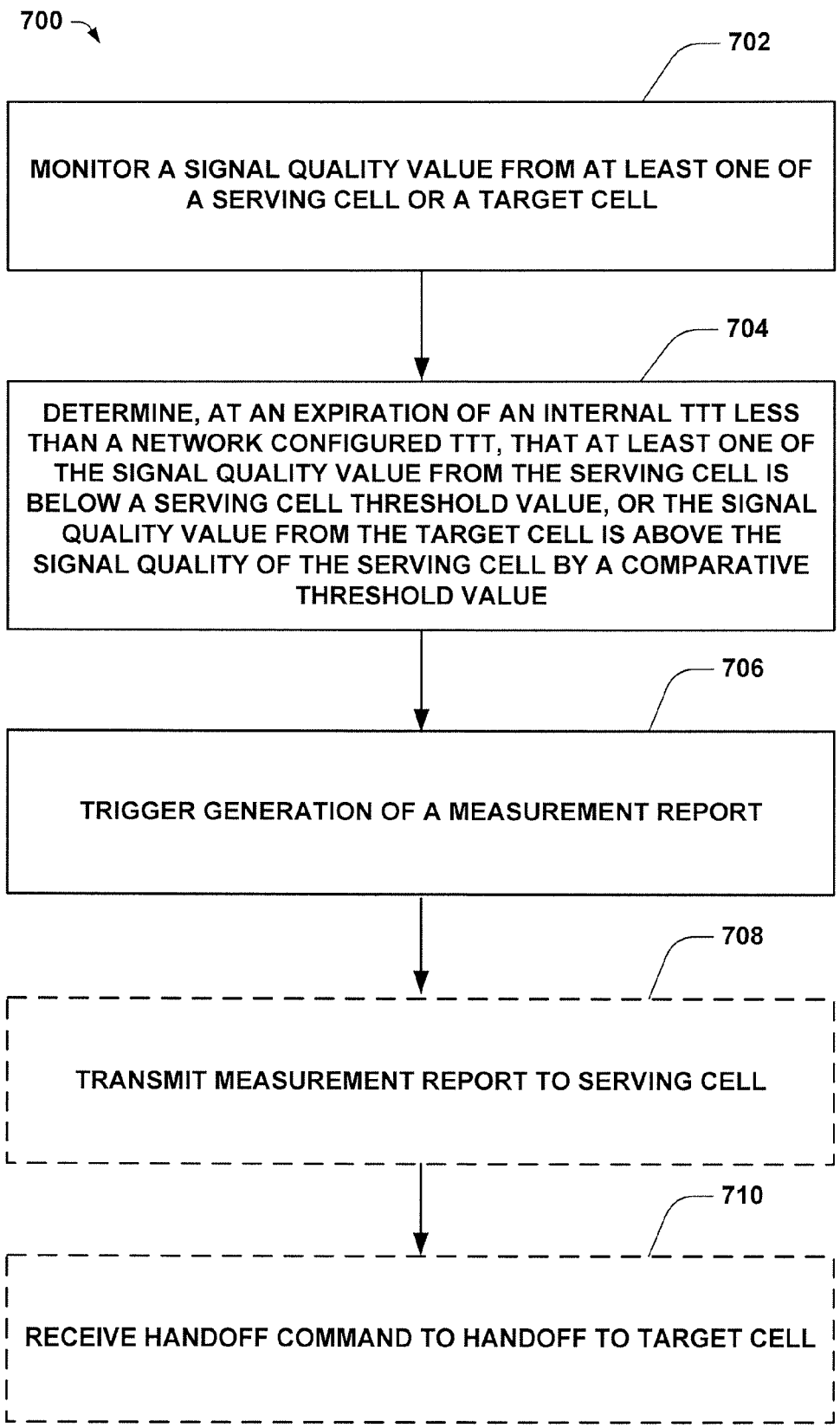
FIG. 7 is a flow chart of an example methodology for improving call performance during poor or changing downlink radio conditions, e.g., according to FIG. 6.

Referring to FIG. 7, an example methodology 700 is displayed that improves call performance during poor or changing DL radio conditions. In an aspect, the methodology 700 may be performed by a UE (e.g., apparatus 602, FIG. 6). The example methodology 700 is shown and described as a series of acts for purposes of simplicity of explanation. However, it is to be understood and appreciated that the method (and further methods related thereto) are not limited by the order of acts, as some acts may, in accordance with one or more aspects, occur in different orders and/or concurrently with other acts from that shown and described herein. For example, it is to be appreciated that the method may alternatively be represented as a series of interrelated states or events, such as in a state diagram. Moreover, not all illustrated acts may be required to implement a method in accordance with one or more features described herein.

At block 702, method 700 may include monitoring a signal quality value from at least one of a serving cell or a target cell. For example, as described herein, TTT module 650 (FIG. 6) may execute DL signal condition monitoring module 606 to monitor a signal quality value from at least one of a serving cell or a target cell Further, at block 704, method 700 may include determining at an expiration of an internal TTT less than a network configured TTT that at least one of the signal quality value from the serving cell is below a serving cell threshold value, or the signal quality value from the target cell is above the signal quality of the serving cell by a comparative threshold value. For instance, TTT module 650 (FIG. 6) may execute severe cell change determination module 610 to determine that at least one of the signal quality value from the serving cell is below a serving cell threshold value, or the signal quality value from the target cell is above the signal quality of the serving cell by a comparative threshold value.

Moreover, at block 706, method 700 may include triggering generation of a measurement report based on the determination. For example, TTT module 650 (FIG. 6) may execute severe cell change determination module 610 to trigger generation of a measurement report based on the determination.

Further, at block 708, method 700 may include transmitting the measurement report to the serving cell. For example, apparatus 602 (FIG. 6) may execute transmission module 612 to transmit the measurement report to the serving cell.

Further, at block 708, method 700 may include receiving a handoff command to handoff to the target cell. For example, apparatus 602 (FIG. 6) may execute any one or more components/modules to receive a handoff command to handoff to the target cell.

Figure 8:
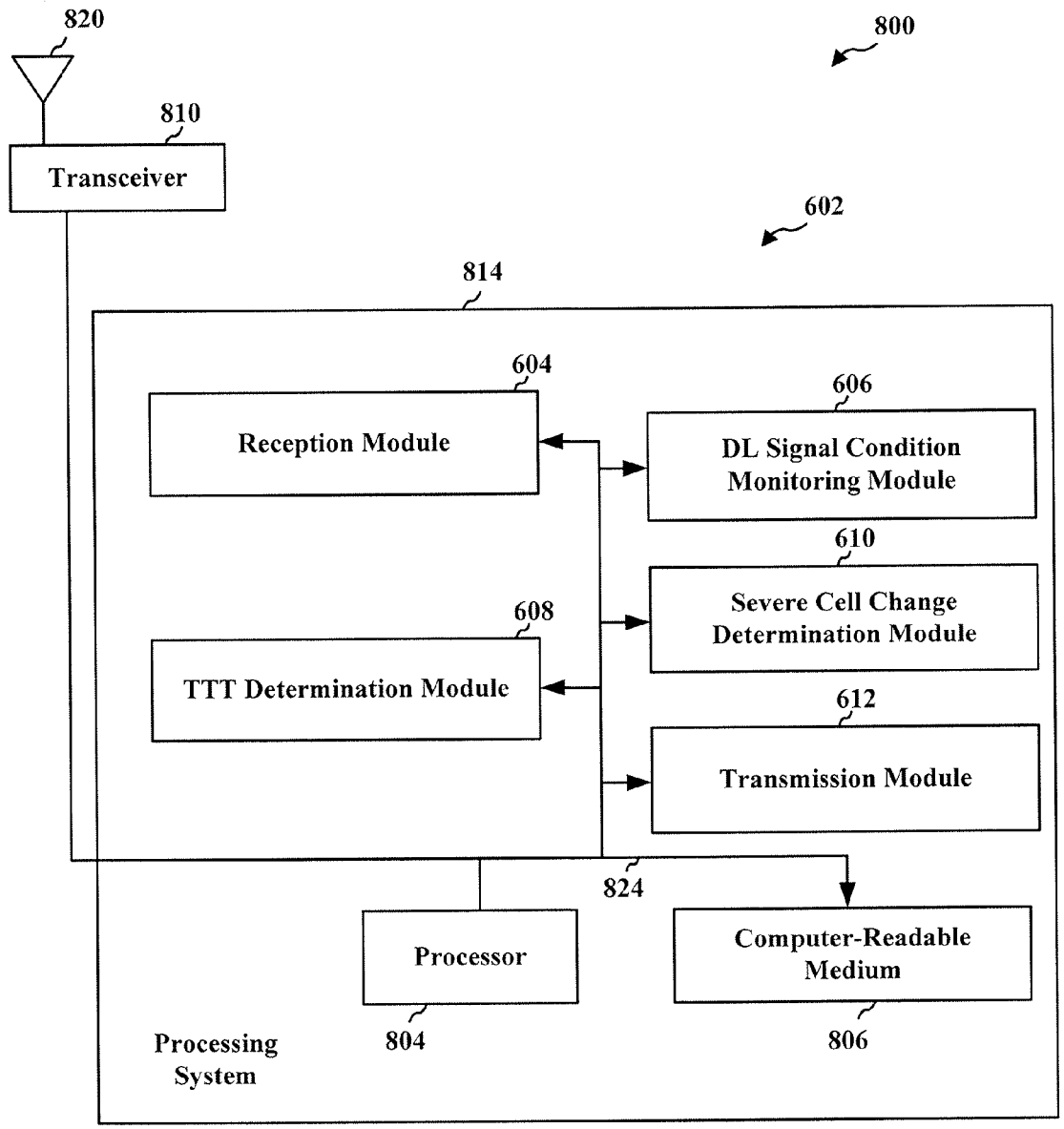
FIG. 8 is a diagram illustrating an example of a hardware implementation for an apparatus employing a processing system, e.g., according to FIG. 6.

FIG. 8 is a diagram 800 illustrating an example of a hardware implementation for an apparatus 602 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 604, 606, 608, 610, 612, 650, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes at least one of the modules 604, 606, 608, 610, 612 and 650. The modules may be software modules running in the processor 804, resident/stored in the computer-readable medium 806, one or more hardware modules coupled to the processor 804, or some combination thereof. The processing system 814 may be a component of the wireless device 450 and may include the memory 492 and/or at least one of the TX processor 480, the RX processor 470, and the controller/processor 490.

In one configuration, the apparatus 602/602' for wireless communication includes means for monitoring a signal quality value from at least one of a serving cell or a target cell, means for determining that at least one of the signal quality value from the serving cell is below a serving cell threshold value, or the signal quality value from the target cell is above the signal quality of the serving cell by a comparative threshold value, and means for triggering generation of a measurement report based on the determination. In an aspect, the apparatus 602/602' may further include means for transmitting the measurement report to the serving cell, means for receiving a signaling message from the serving cell as part of a Change of Best Cell procedure, and means for handing off to the target cell based on reception of the signaling message. In an aspect, the apparatus 602 may further include means for adding a percentage of the CIO value to the corresponding cell threshold value.

The aforementioned means may be one or more of the aforementioned modules of the apparatus 602 and/or the processing system 814 of the apparatus 602 configured to perform the functions recited by the aforementioned means. As described herein, the processing system 814 may include the TX processor 480, the RX processor 470, and the controller/processor 490. As such, in one configuration, the aforementioned means may be the TX processor 480, the RX processor 470, and the controller/processor 490 configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
    monitoring, by a user equipment (UE), a signal quality value of at least one of a serving cell or a target cell;
    setting an internal time to trigger (TTT) to a value less than a network-configured TTT;
    determining, upon expiration of the internal TTT, that at least one of the signal quality value from the serving cell is below a serving cell threshold value or the signal quality value from the target cell is above the signal quality of the serving cell by a target cell threshold value;
    triggering generation of a measurement report based on the determination;
    transmitting the measurement report to the serving cell; and
    receiving a handoff command to perform a handoff or a soft handoff of the UE to the target cell in response to the transmitting of the measurement report to the serving cell.

2. The method of claim 1, further comprising setting the internal TTT as a function of a minimum TTT and the network-configured TTT.

3. The method of claim 2, wherein the internal TTT triggers the determination at an expedited time relative to the network-configured TTT, and wherein the minimum TTT comprises a UE configured time duration.

4. The method of claim 1, further comprising:
    performing the handoff or the soft handoff of the UE to the target cell based on reception of the handoff command.

5. The method of claim 1, wherein the handoff command comprises a signaling message associated with a Change of Best Cell procedure.

6. The method of claim 1, wherein the serving cell threshold value or the target cell threshold value is modified by a corresponding cell identifier offset (CIO) value.

7. The method of claim 6, wherein the CIO value for the serving cell or the target cell corresponds to a primary common pilot channel (PCPICH) of the serving cell or the target cell, respectively.

8. The method of claim 6, wherein the modification comprises adding a percentage of the respective CIO value to the serving cell threshold value or the target cell threshold value.

9. A non-transitory computer-readable medium storing computer executable code for wireless communications, comprising:
    code for monitoring, by a user equipment, a signal quality value of at least one of a serving cell or a target cell;
    setting an internal time to trigger (TTT) to a value less than a network-configured TTT;
    code for determining, upon expiration of the internal TTT, that at least one of the signal quality value from the serving cell is below a serving cell threshold value or the signal quality value from the target cell is above the signal quality of the serving cell by a target cell threshold value;
    code for triggering generation of a measurement report based on the determination;
    code for transmitting the measurement report to the serving cell; and
    code for receiving a handoff command to perform a handoff or a soft handoff of the UE to the target cell in response to the transmitting of the measurement report to the serving cell.

10. An apparatus for wireless communications, comprising:
    means for monitoring, by a user equipment a signal quality value of at least one of a serving cell or a target cell;
    means for setting an internal time to trigger (TTT) to a value less than a network-configured TTT;
    means for determining, at an expiration of an internal time to trigger (TTT) which is less than a network-configured TTT, that at least one of the signal quality value from the serving cell is below a serving cell threshold value or the signal quality value from the target cell is above the signal quality of the serving cell by a target cell threshold value;
    means for triggering generation of a measurement report based on the determination;
    means for transmitting the measurement report to the serving cell; and
    means for receiving a handoff command to perform a handoff or a soft handoff of the UE to the target cell in response to the transmitting of the measurement report to the serving cell.

11. An apparatus for communication, comprising:
    a downlink signal condition monitoring module configured to monitor a signal quality value of at least one of a serving cell or a target cell;
    a serving cell change determination module configured to set an internal time to trigger (TTT) to a value less than a network-configured TTT;
    the serving cell change determination module further configured to determine, upon expiration of the internal TTT, that at least one of the signal quality value from the serving cell is below a serving cell threshold value or the signal quality value from the target cell is above the signal quality of the serving cell by a target cell threshold value, wherein the serving cell change determination module is further configured to trigger generation of a measurement report based on the determination;
a transmission module configured to transmit the measurement report to the serving cell; and
a reception module configured to receive a handoff command to perform a handoff or a soft handoff of the UE to the target cell in response to the transmitting of the measurement report to the serving cell.

12. The apparatus of claim 11, further comprising a TTT determination module configured to set the internal TTT as a function of a minimum TTT and the network-configured TTT.

13. The apparatus of claim 12, wherein the internal TTT triggers the determination at an expedited time relative to the network-configured TTT, and wherein the minimum TTT comprises a UE configured time duration.

14. The apparatus of claim 11, wherein one or both of the transmission module and reception module are further configured to perform the handoff or the soft handoff of the UE to the target cell based on reception of the handoff command.

15. The apparatus of claim 11, wherein the handoff command comprises a signaling message associated with a Change of Best Cell procedure.

16. The apparatus of claim 11, wherein the serving cell threshold value or the target cell threshold value is modified by a corresponding cell identifier offset (CIO) value.

17. The apparatus of claim 16, wherein the CIO value for the serving cell or the target cell corresponds to a primary common pilot channel (PCPICH) of the serving cell or the target cell, respectively.

18. The apparatus of claim 16, wherein the modification comprises adding a percentage of the respective CIO value to the serving cell threshold value or the target cell threshold value.

* * * * *